(12) United States Patent
Kellam et al.

(10) Patent No.: US 7,826,921 B2
(45) Date of Patent: Nov. 2, 2010

(54) BUILDING LUMBER PACKAGE ASSEMBLY METHOD AND SYSTEM

(75) Inventors: David F. Kellam, Lufkin, TX (US); William Thomas Eckmann, Lufkin, TX (US); Michael B. Warren, Diboll, TX (US)

(73) Assignee: TIN, Inc., Diboll, TX (US)

( * ) Notice: Subject to any disclaimer, the term of this patent is extended or adjusted under 35 U.S.C. 154(b) by 559 days.

(21) Appl. No.: 11/536,761

(22) Filed: Sep. 29, 2006

(65) Prior Publication Data
US 2008/0082204 A1   Apr. 3, 2008

(51) Int. Cl.
   *G06F 7/00* (2006.01)
(52) U.S. Cl. ............... 700/223; 700/213; 144/41
(58) Field of Classification Search .......... 700/223, 700/230, 213; 144/41
   See application file for complete search history.

(56) References Cited

U.S. PATENT DOCUMENTS

| | | | |
|---|---|---|---|
| 1,551,807 A | 9/1925 | Dittmar et al. | |
| 2,600,147 A | 6/1952 | Wilson | |
| 2,867,323 A | 1/1959 | Cook | |
| 3,027,007 A | 3/1962 | Moseley | |
| 3,101,754 A | 8/1963 | Stupfel | |
| 3,279,600 A | 10/1966 | Lawson | |
| 3,292,783 A | 12/1966 | Quist, et al. | |
| 3,399,768 A | 9/1968 | Holmberg et al. | |
| 3,502,123 A | 3/1970 | Golick et al. | |
| 3,581,891 A | 6/1971 | Rysti | |
| 3,631,977 A | 1/1972 | Taul | |
| 3,696,948 A | 10/1972 | Murdoch et al. | |
| 4,071,061 A * | 1/1978 | Schneider | 144/345 |
| 4,098,407 A | 7/1978 | Moore | |

(Continued)

FOREIGN PATENT DOCUMENTS

EP    1099486 A2    5/2001

(Continued)

OTHER PUBLICATIONS

Walsh, Kenneth D., et al., "Simulation of the Residential Lumber Supply Chain," Proceedings of the 2003 Winter Simulation Conference, pp. 1548-1551.

(Continued)

*Primary Examiner*—Gene Crawford
*Assistant Examiner*—Ramya Prakasam
(74) *Attorney, Agent, or Firm*—Conley Rose, P.C.

(57) ABSTRACT

A system for assembling a building lumber package includes a lumber sorter sequentially receiving a plurality of boards of different dimensions and selectively placing boards into a plurality of bins, a computer programmed to receive a list of different dimension lumber, to designate one or more bins for accumulating the lumber designated on the list, to receive dimension information identifying each board received by the sorter, and to control the lumber sorter to place boards designated on the list into bins designated for accumulating lumber identified on the list The system may process a plurality of orders for building lumber packages at essentially the same time. Lumber at a lumber mill is sorted into building lumber packages at the lumber mill and stacked and strapped by automated stackers and strappers at the lumber mill. The building lumber packages may be shipped directly from the lumber mill to a building site.

23 Claims, 3 Drawing Sheets

U.S. PATENT DOCUMENTS

| | | | |
|---|---|---|---|
| 4,185,672 A | | 1/1980 | Vit et al. |
| 4,195,346 A | | 3/1980 | Schroder |
| 4,195,737 A | | 4/1980 | Rysti |
| 4,253,361 A | | 3/1981 | Pryor et al. |
| 4,358,009 A | | 11/1982 | Rysti |
| 4,742,920 A | | 5/1988 | Doherty |
| 4,805,679 A | * | 2/1989 | Czinner ................. 144/357 |
| 5,613,827 A | * | 3/1997 | Vande Linde ............ 414/791.6 |
| 5,934,480 A | | 8/1999 | Bailey |
| 6,016,922 A | | 1/2000 | Burman |
| 6,510,364 B2 | | 1/2003 | Ahrens |
| 6,629,592 B2 | | 10/2003 | Bernard et al. |
| 6,776,293 B1 | | 8/2004 | Gunnarsson |
| 6,826,990 B2 | | 12/2004 | Olsen |
| 2003/0230519 A1 | | 12/2003 | Cesselli |
| 2006/0201582 A1 | * | 9/2006 | Edwards ................. 144/363 |

FOREIGN PATENT DOCUMENTS

| | | |
|---|---|---|
| GB | 2370350 A | 6/2002 |
| WO | 7900215 A1 | 4/1979 |

OTHER PUBLICATIONS

Novelty Search Results for "Method of Packaging Building Lumber," Lieberman & Brandsdorfer, LLC, Feb. 28, 2006, 6 pgs.

* cited by examiner

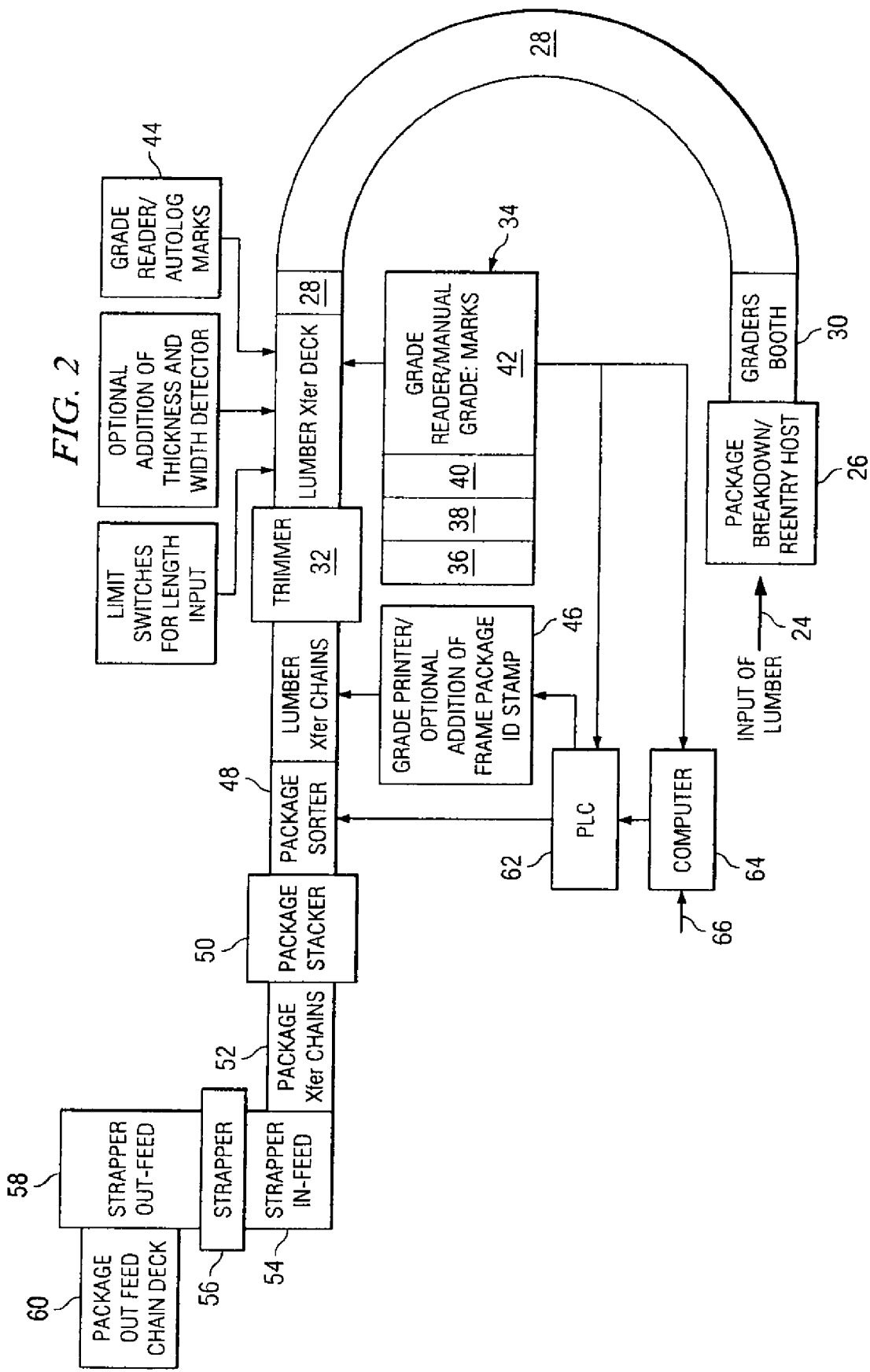

US 7,826,921 B2

BUILDING LUMBER PACKAGE ASSEMBLY METHOD AND SYSTEM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to assembly of lumber into packages needed to construct a building or other component or structure, and in one embodiment to an automated system including a programmed computer system and a lumber sorter controlled by the computer system.

BACKGROUND

The supply chain for lumber used to build houses begins with growing timber which is cut into logs and delivered to a lumber mill. The logs are delivered to the sawmill portion of the lumber mill. Modern sawmills are highly automated and cut each log into various dimension lumber, or board, sizes that produce the most useful dimension lumber possible from the logs. The output of the sawmill portion of a lumber mill is a mix of lumber sizes which are routed to sorting machines that separate the lumber into bins for each size, e.g. ten foot long 2×4s (two by fours), twelve foot long 2×6s, etc. The sawmill sorting operation normally does not sort by grade.

The separated lumber from the sawmill is typically dried and then delivered to the planermill portion of the lumber mill. In the planermill, the lumber is planed, graded, and sorted again according to grade as well as dimensions before being packaged in pallet loads, e.g. full pallets of 208 ten-foot 2×4s, ready for sale.

The full pallets of lumber are typically sold to lumberyards. The lumberyards may resell full pallets. However, builders prefer that lumber be delivered to a building site with only the specific number of each size and grade of lumber needed for building a home. Some builders use computer systems for designing homes and the computer systems often generate one or more bills of materials or material take off lists for the specific home. One typical bill of materials lists all of the lumber needed to frame a house. If the builder has such a computer-generated bill of materials, he typically provides the bill of materials to a lumberyard. A yard worker uses the list to collect the specified numbers of each lumber dimension and grade, assemble the collected lumber into manageable bundles, and strap the bundles for delivery by truck to a building site. If a builder does not have a computer-generated bill of materials, he may simply provide a house plan to a lumberyard and the yard worker may produce a bill of materials from the plan. The lumber for framing a house is typically called a framing package or frame pack, although it typically includes a number of separate bundles or subpackages.

SUMMARY

A system for assembling a building lumber package, including a lumber sorter sequentially receiving a plurality of boards and selectively placing boards into a plurality of bins, a computer system programmed to receive a list of different dimension lumber, to designate one or more bins for accumulating the lumber designated on the list, to receive dimension information identifying each board received by the sorter, and to control the lumber sorter to place boards designated on the list into bins designated for accumulating lumber identified on the list.

In one embodiment, the system receives a plurality of orders for building lumber packages, each order designating the list of different dimension lumber, designates one or more bins for accumulating lumber for a selected group of orders, and controls the sorter to accumulate boards for the selected group of orders at essentially the same time.

An embodiment provides a simplified supply chain for providing lumber to homebuilders. Finished lumber at a lumber mill is sorted into building lumber packages by automated sorters at the lumber mill and stacked and strapped by automated stackers and strappers at the lumber mill. The building lumber packages are shipped directly from the lumber mill to a building site.

In one embodiment, the system sorts lumber by grade as well as by dimensions.

BRIEF DESCRIPTION OF THE DRAWINGS

FIG. 2 is a somewhat schematic illustration of an embodiment of a building lumber package assembly system according to the present disclosure.

DETAILED DESCRIPTION OF EMBODIMENTS

Figure 1:
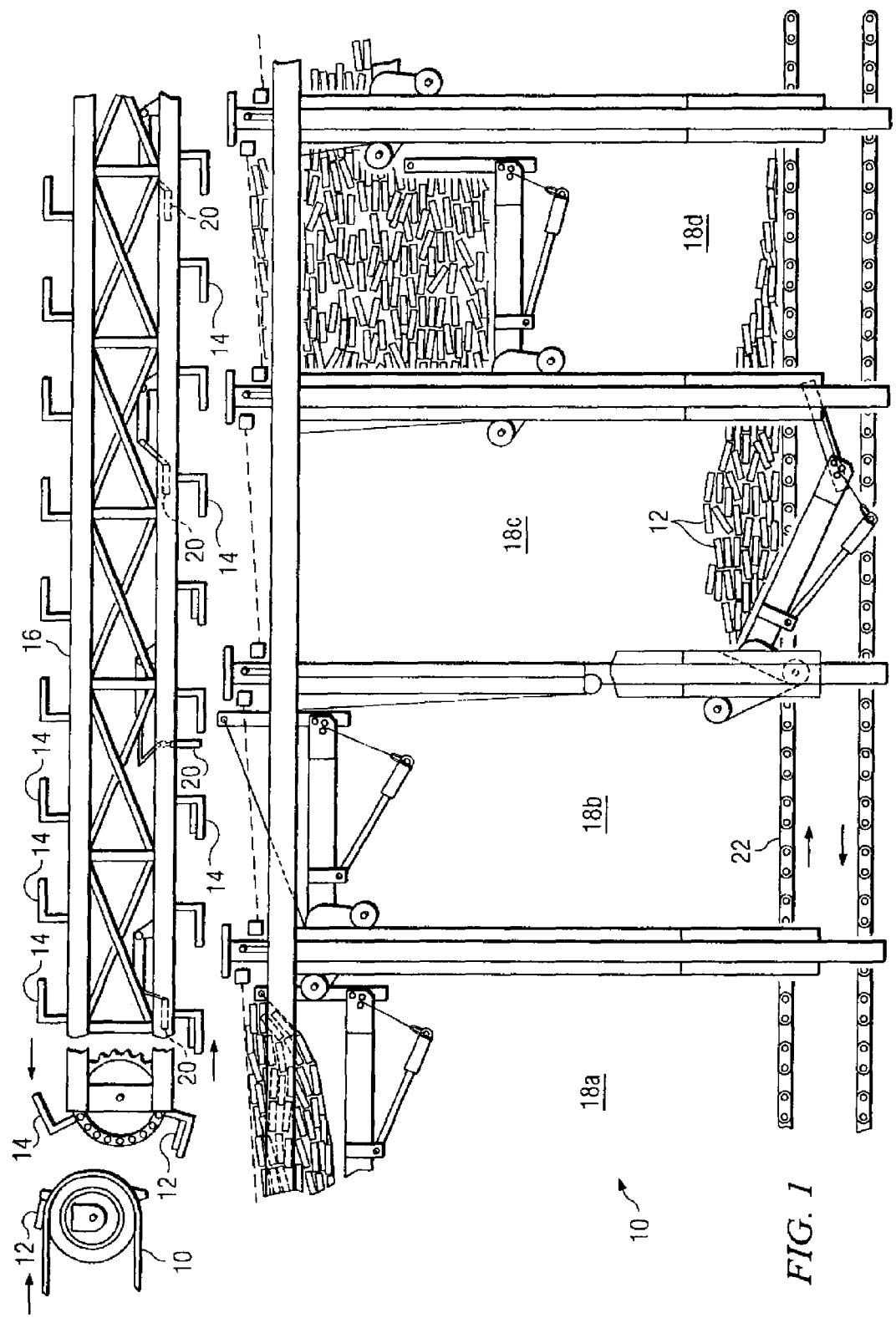
FIG. 1 is an illustration of a typical lumber sorting system.

In describing embodiments of the present disclosure, various terms used in the lumber and construction businesses are used.

Dimension lumber means boards that have an actual length, nominal thickness, and nominal width. For example a ten-foot 2×6 is about ten feet long, has a nominal thickness of two inches (actual about 1.5 inches) and a nominal width of six inches (actual about 5.5 inches).

Builders may order various building lumber packages. A framing package, often referred to as a frame pack, typically includes all of the various dimension lumber needed by the builder to build a house frame. A roofing package, or roof pack, includes all of the various dimension lumber needed to build the roof structure and may include the roof decking. In similar fashion, builders may order foundation packages of lumber needed to build forms for a slab foundation, and may order cornice or finish packages. Some builders may include one of more of a foundation package, roofing package, or finish package with a framing package. Similar building lumber packages may be ordered for construction of other structures built with lumber. For example, outdoor decks, barns, storage sheds and even small play houses may be built independently or in conjunction with construction of a house and the builder may order a building lumber package for such other structures. The term building lumber package is used herein to mean any one of, or any combination of, such building lumber packages. Building lumber packages typically specify lumber grade needed for each piece of lumber.

As used herein, an order is a request from a homebuilder for purchase of a building lumber package. It may include the legal documents to form a contract, but for purposes of the embodiments described herein, it includes a bill of materials, by hardcopy, electronic copy, etc., that identifies a set of dimension lumber required for a building lumber package. An order may expressly include the bill of materials, i.e. include a list of how many of each dimension and grade of lumber is required to form the requested building lumber package. Alternatively, builders may provide in advance bills of materials for various standard house models that they may build many of. A particular order may simply identify the house model and request one or more building lumber packages for that model. An order may include a house plan, without a separate bill of materials listing the required numbers of each dimension a grade lumber needed for the plan. Each building lumber package may be assembled and delivered to the building site in the form of multiple bundles of lumber.

As discussed above, lumber mills have used lumber sorting equipment to sort a stream of mixed dimension lumber into bins having common dimensions, at least thickness and width. A sorter in the sawmill portion of a lumber mill will normally sort by dimensions, but not grade. A sorter in the planermill portion of a lumber mill will typically sort by dimension and grade. In some cases, multiple lengths, within a limited range, and multiple grades, e.g. grade 2 or better, have been accumulated into the same bin and stacked and strapped for sale. Regardless of the specific dimension or dimensions picked, the goal is to collect and group like-with-like or a given piece of lumber with other lumber having at least one similar dimension or characteristic.

FIG. 1 is an illustration of a prior art sorting system. A conveyor 10 carries individual pieces of lumber, i.e. boards, 12, for example from a sawmill or planermill. Each piece of lumber 12 has been identified by certain characteristics, for example, length, width, thickness and, if the sorter is in the planermill, possibly grade, and a control system keeps track of the location of each board 12. The boards 12 are deposited on hooks 14 on a second conveyor 16. The conveyor 16 moves the boards 12 across the open tops of a series of bins 18*a-d*. A cylinder-actuated arm 20 is located above each bin 18. Each bin is designated to receive one dimension, and possibly grade, board. When the control system determines that a board 12 is passing over its designated bin, it actuates the arm 20 above the bin, stopping the board so that it is released from the hooks 14 and drops into the bin. For example, the arm 20 above bin 18*b* is shown actuated ready to stop the next board 12. When a bin 18 is filled to a desired capacity as shown for bin 18*c*, the bin releases the collected load of lumber onto a lower conveyor 22 that carries the lumber to stacking equipment for stacking into one or more standard pallet loads typically containing one size, and possibly one grade, of dimension lumber.

In the disclosed embodiments, a conventional lumber sorting system, e.g. the one shown in FIG. 1, is controlled by a new control system so that it operates in a new and unconventional way. Instead of sorting one dimension of lumber in each bin 18, the system is controlled to load preselected sets, e.g. frame packages, of different dimension and grade lumber into the bins 18.

FIG. 2 illustrates one embodiment of a building lumber package assembly system. The FIG. 2 system is a modified form of a grading, sorting, and packaging system normally used in a planermill for sorting lumber into pallet loads of dimensioned lumber, e.g. pallets of ten foot 2×4s, grade 2. The system is modified to produce building lumber packages of mixed dimension and grade lumber according to orders received from customers, e.g. homebuilders.

In FIG. 2, lumber is input at 24 into the system through a package breakdown and reentry hoist 26 that lifts and deposits lumber on a conveyor 28 that begins in a grader's booth 30. The graders booth may or may not be manned and operated during practice of methods discussed below. The conveyor 28 extends to and through a trimmer 32, which typically will not be used in methods discussed below. In this embodiment, a set 34 of sensors or detectors are provided adjacent and/or over the conveyor 28 to measure lumber dimensions and grades. These sensors include a length sensor 36, a width sensor 38, and a thickness sensor 40. In addition, a grade reader for sensing manual grade marks 42 and a grade reader for sensing automatically generated grade marks 44 are provided. In this embodiment, a grade printer 46 normally used to print the automatically generated grade marks may be modified to print a package ID stamp linking each board with the individual lumber package to which it is assigned.

The lumber traveling on conveyor 28 is placed onto hooks, e.g. hooks 14 of FIG. 1, of a package sorter 48, which may be similar to the sorter of FIG. 1 or any conventional lumber sorter. In this embodiment, the sorter 48 has 53 bins into which it can sort lumber. When a bin is filled with the desired package of lumber, the bin is emptied onto a conveyor, e.g. conveyor 22 of FIG. 1, and is delivered to a package stacker 50. Stacked packages are transferred by transfer chains 52 and a strapper infeed conveyor 54 to a strapper 56. The strapped packages are transferred out of the strapper by an outfeed conveyor 58 and chain deck 60, from which they may be removed by forklifts, etc.

In this embodiment, the package sorter is controlled by a programmed logic controller, PLC, 62 and a computer 64 which, from the viewpoint of the method, work in concert to act as a computer system. The PLC 62 and computer 64 may receive inputs from the sensors 34 and may receive inputs 66, e.g. a bill of materials from a home-builder, received over the internet or other data entry means.

Figure 3:
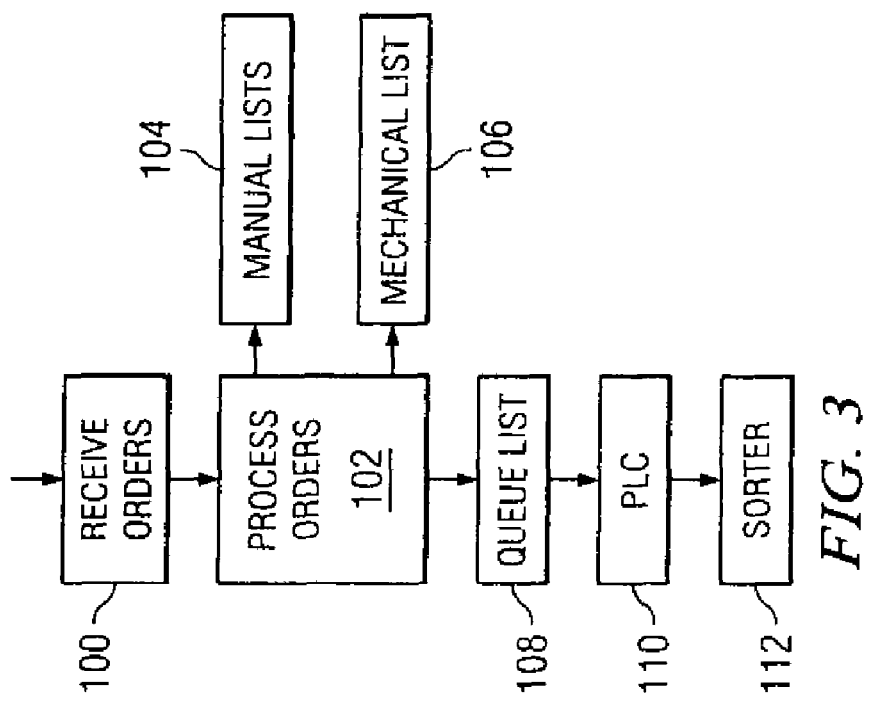
FIG. 3 is a flow diagram of an embodiment of a building lumber package assembly system and process according to the present disclosure.

With reference to FIG. 3, an embodiment of a building lumber package assembly system and process is described. The process begins at step 100 where orders are received from homebuilders. The orders may be received by the computer 64. Each order may be a bill of materials identifying all the lumber needed by the homebuilder for a particular phase of building construction, for example framing. Each order therefore identifies a particular building lumber package. While a single order could be processed in the system described herein, it should be more efficient to process as many orders as the system can handle at one time.

At step 102, the orders are processed, e.g. in the computer 64. Each order is checked for full pallets of dimension lumber. For example, if a particular order includes 322 eight foot 2×4s and a full pallet of eight foot 2×4s includes 208 boards, then the system, e.g. computer 64, will output a manual pull list at 104 including one full pallet and reduce the number that need to be accumulated in the sorter 48 to 114. If all the orders collectively include a small piece count of a particular dimension or grade of lumber, for example only one 18 foot 2×6 #3, then that one piece may also be output to the manual pull list. The manual pull list will also identify which order the materials are assigned to so that they may be associated with the final building lumber package assembled for each order.

After identifying the full pallets and only small piece count boards, the processor, e.g. computer 64, can determine exactly the set of dimension lumber that needs to be accumulated in the sorter 48 for each order to assemble a requested building lumber package. It also produces a total listing at 106 of all lumber needed to complete all the orders that will be processed at the same time. This listing is referred to as a mechanical pull list, since it may be used to collect pallets of lumber from a warehouse and feed them into the reentry hoist 26.

At step 108, the system, e.g. computer 64, produces a queue or accumulation list that identifies the sets of dimension lumber that are to be accumulated in each bin in sorter 48. In theory, all lumber that is needed for a given order could be accumulated in a single bin. However, in this embodiment each order is accumulated in a plurality of bins for a number of reasons. Typically, each order will include more lumber than can be accumulated in a single bin and more than could be formed into a manageable bundle by the stacker 50. Typical stackers 50 work best if all lumber in a bundle has the same thickness. The strapper 56 works best if the lumber length dimensions are somewhat similar, e.g. within a six foot range. Thus one example of a best practice would call for stacking eight-foot to fourteen-foot lumber together and stacking fourteen-foot to twenty-foot lumber together. When these practical considerations are taken into account, a typical order may be accumulated into about five bins in the sorter 48. Several bins in the sorter should be reserved for receiving extra lumber, i.e. lumber fed into the system in excess of what is needed to fill all orders. In this embodiment, the sorter 48 has 53 bins and may be able to accumulate about ten separate orders at the same time, with three bins reserved for the extra lumber.

The queue list at 108 is also printed out for record keeping, billing, etc. purposes and to provide labels for the finished bundles that together form a complete building lumber package. At 110, the queue list is transferred, e.g. from computer 64, to the PLC 62. The transfer may be by direct electronic connection or may be by means of computer readable media produced by the computer 64 or could even be by manual input of the queue list. At step 112, the PLC 62 uses the queue list to control the accumulation of lumber in each of the bins in sorter 48 and thereby assemble the building lumber packages corresponding to each order. The PLC 62 may receive inputs from the sensors 34 so that it knows the dimensions and grade of each board entering the sorter 48. When full pallets of same dimension and grade lumber are input into the reentry hoist 26, the dimensions and grade may be manually input into the PLC 62. The PLC 62 then causes the sorter 48 to drop the boards into the appropriate bins 18 by controlling the arms 20 until each bin has accumulated the proper number of each selected dimension and grade lumber. When a bin has accumulated all lumber designated on its queue, the PLC 62 may turn on a full indicator light so that an operator may empty the bin onto the lower conveyor 22 and move it to the stacker 50.

Lumber may be input to the reentry hoist 26 from several sources and in various orders. At step 106, the computer generates a complete list of all dimension lumber that needs to be input to the sorter to provide the correct number of boards in each bin. For example, all bins together may require 600 eight-foot 2×4s, grade 2. Three full pallets of eight-foot 2×4s, grade 2 may be opened and loaded into the reentry hoist and the system will distribute them among the various bins until each has its required number. Since each full pallet has 208 2×4s, there would be twenty-four extras, which would be placed in an overflow bin. This process may be continued with additional full pallets of boards of each dimension and grade entered in the system and distributed by the sorter to the proper bins. In this embodiment, the sensors 34 may not be needed, if the dimensions and grades of boards being entered into the system are manually entered into the PLC 62. In this embodiment, lumber may be entered into the system in an order selected to improve stacking and strapping. For example, the boards may be entered in order of length, with the longest entered first. This would tend to place the longer boards on the bottom of a bundle and shorter boards on top, although some mixing may occur as the boards are transferred to the stacker 50.

As noted above, it is desirable although not required that boards of different thickness not be included in the same bundle to facilitate best operation of the stacker and strapper. If the processor 66 does not mix thickness in any queue and only two-inch thickness boards are loaded, none of them will be accumulated in the queues designated for the one-inch thick boards. This provides the opportunity to assemble building lumber packages sequentially instead of simultaneously. For example, after the processor calculates the boards needed for each queue, the PLC may be provided with a first queue list for two inch lumber and a second list for one inch lumber, but all with associated identification numbers so the bundles from queues for a given order may be shipped together. For a first period of operation the sorter bins may be assigned for only two-inch lumber and for a second period of time the bins may be assigned for one-inch lumber. As noted above, a typical order may use about five bins to accumulate the entire lumber building package and the system may assemble about ten orders at the same time. If the queues are divided by board thickness, more orders may be accumulated at the same time, and the entry process may be simplified since more of each dimension lumber would be entered on each assembly cycle.

It is common in lumber mills for partial pallets of lumber to be produced at the end of a run of a particular dimension board. It is also common that some lumber passed through the original sorting process incorrectly and was missorted and collected in randomly mixed bundles having multiple lengths and widths and possibly thickness. The sensors 34 of FIG. 2 are preferred so that such partial and mixed bundles may be input into the system and used to assemble the building lumber packages. Such partial and mixed bundles of lumber may be entered into the system at the reentry hoist 26. The PLC 62 may be programmed to use the outputs of the sensors 34 to identify the dimensions and grade of each board as it passes the sensors and drop each board in an appropriate sorter 48 bin. In this embodiment using partial and missorted lumber, it may be desirable to man the grader's booth 30 and recheck the grade indicators on the boards. In the past, such partial and mixed bundles have normally been reentered in the grading and sorting system so that they may be sorted into standard full pallets of common dimension and grade boards. In this embodiment the same amount of time and labor may be used to sort the partial and mixed bundles into a higher value product, i.e. a building lumber package to be shipped directly to a builder.

The PLC can provide a running report of how many additional boards of each dimension and grade are needed to complete the building lumber packages being currently assembled so that operators may locate and enter additional bundles of lumber. Any extra boards entered in the system would be accumulated in one of the overflow bins and bundled into partial or mixed bundles for future use.

As noted above, after each bin in sorter 48 is filled with all boards on its associated queue, the contents of the bin are transferred to the stacker where it is organized into a manageable and stable bundle. If an order requires one or more additional boards as indicated by the manual list 104, the stacker operator may place the additional board in the bundle.

After stacking, the bundle is moved to the strapper where it is formed into a completed bundle suitable for movement by forklifts and trucks for storage and shipment directly to the building site of the homebuilder. Since a number of bundles, e.g. about five, may be required to form a complete building lumber package, the labels provided by the PLC will identify each bundle by its specific building lumber package and how many bundles are included in the package. The identification may be by homebuilder name, order number, date, house model, etc. and may include a list of all lumber included in each bundle. The label may also indicate how many full pallets are included in the order.

When all the bundles forming a building lumber package have been assembled as described above, they may be loaded on a truck. The package will normally include one or more standard full pallets of single dimension lumber, e.g. a pallet of stud length 2×4s. The entire building lumber package may be shipped directly to the building site as specified by the homebuilder. If the building lumber package is shipped by a common carrier truck line, it may pass through or be stored temporarily in a truck yard or other transshipment facility. Alternatively, the building lumber packages may be delivered to a warehouse or lumberyard for temporary storage and delivery to the building site when it is needed. If delivered to a lumberyard, the packages would not be opened at the lumberyard, but delivered intact to the building site.

There are advantages of the disclosed embodiments as compared to the prior art building lumber package assembly and delivery methods. The packages are assembled in a building at a lumber mill instead of in a lumberyard. The packages are assembled by automated equipment instead of manually. There is less chance for errors and it is easier to generate labels, invoices, shipping documents, etc. in the lumber mill environment. Existing sorting equipment at a lumber mill may be modified to operate as described herein, thereby avoiding capital costs and allowing more efficient use of the existing equipment. The lumber does not have to be shipped twice, i.e. once from a lumber mill to a lumberyard and then from the yard to the building site. Instead it may be shipped directly from the lumber mill to the building site.

In the above-described embodiments, the building lumber package assembly system is located and operated at a lumber mill, which provides a number of advantages. In alternative embodiments, the system may be located and operated at a reload center or a lumber yard and still improve efficiency of the supply chain. Reload centers generally increase efficiency of the lumber supply chain by moving large shipments of full pallets of lumber over long distances to a reload center by rail. Then the large shipments are divided into smaller shipments of full pallets and delivered by truck from the reload center to lumber yards. An embodiment of the present invention may be installed and operated at a reload center for assembling building lumber packages for delivery from the reload center directly to a builder and many of the advantages discussed above will be achieved.

Figure 4:
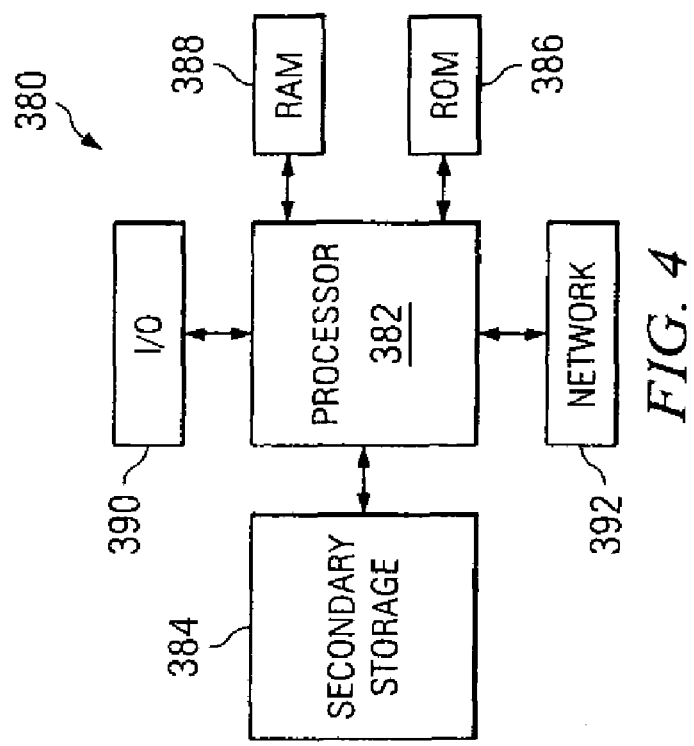
FIG. 4 is a block diagram of a general-purpose computer system suitable for implementing one or more embodiments of the present disclosure.

The control system described above may be implemented on any general-purpose computer with sufficient processing power, memory resources, and network throughput capability to handle the necessary workload placed upon it. FIG. 4 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) 390 devices, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O 390 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 392 devices may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data base band signal or signal embodied in a carrier wave. The base band signal or signal embodied in the carrier wave generated by the network connectivity 392 devices may propagate in or on the surface of electrical conductors, in coaxial cables, in waveguides, in optical media, for example optical fiber, or in the air or free space. The information contained in the base band signal or signal embedded in the carrier wave may be ordered according to different sequences, as may be desirable for either processing or generating the information or transmitting or receiving the information. The base band signal or signal embedded in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

The functions of both the computer 64 and PLC 62 shown in FIG. 2 may be implemented in the computer system of FIG. 4 if desired. The embodiment of FIG. 2 includes the PLC 62 primarily because it was an existing piece of equipment used to control the sorter 48 at the time of development of the present embodiments.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed:

1. A system for assembly building lumber packages, comprising:
    a lumber sorter sequentially receiving a plurality of boards and selectively placing boards into a plurality of bins,
    a computer system programmed to
        receive a plurality of building lumber package orders, each building lumber package order identifying a plurality of different dimension lumber needed to build a structure,
        designate one or more bins for accumulating lumber for each building lumber package order,
        receive dimension information identifying each board received by the sorter, and
        control the lumber sorter to place boards identified in each building lumber package order into bins designated for accumulating lumber for each building lumber package order.

2. The system for assembly building lumber packages according to claim 1, wherein:
    the computer system includes a first processor having an input for receiving building lumber package orders and an output providing queues for each of a plurality of bins in the lumber sorter.

3. The system for assembly building lumber packages according to claim 2, wherein:
    the computer system includes a programmed logic controller having an input receiving from the first processor the queues for each of a plurality of bins in the lumber sorter and having an output coupled to the lumber sorter controlling the lumber sorter to place boards identified in each order into bins designated for accumulating lumber for each order.

4. The system for assembly building lumber packages according to claim 1, wherein:
    the computer system is programmed to:
        receive a plurality of building lumber package orders, each order identifying a plurality of different dimension and grade lumber; and
        receive grade information identifying each board received by the sorter.

5. The system for assembly building lumber packages according to claim 1, wherein:
    the computer system is programmed to:
        control the lumber sorter to place boards having only one thickness in any one bin.

6. The method for assembly building lumber packages according to claim 1, further comprising:
    controlling the lumber sorter to place boards having only one thickness in any one bin.

7. A method for assembling building lumber packages, comprising:
    receiving a plurality of building lumber package orders, each building lumber package order identifying a plurality of different dimension lumber needed to build a structure,
    designating one or more bins of a lumber sorter for accumulating lumber for each building lumber package order,
    conveying a plurality of different dimension lumber into the lumber sorter, receiving dimension information for each board received by the sorter, and
    controlling the lumber sorter to place boards identified in each building lumber package order into the one or more bins designated for accumulating lumber for each building lumber package order.

8. The method for assembly building lumber packages according to claim 7, further comprising:
    using a first processor for receiving building lumber package orders and providing queues for each of a plurality of bins in the lumber sorter.

9. The method for assembly building lumber packages according to claim 8, further comprising:
    coupling the queues from the first processor to a programmed logic controller and using the programmed logic controller to control the lumber sorter to place boards identified in each order into bins designated for accumulating lumber for each order.

10. The method for assembly building lumber packages according to claim 7, further comprising:
    receiving a plurality of building lumber package orders, each order identifying a plurality of different dimension and grade lumber; and
    receiving grade information identifying each board received by the sorter.

11. The method for assembly building lumber packages according to claim 7, wherein the building lumber package structure comprises one or more of the group of structures consisting of: a house frame, a roof, forms for a foundation, a cornice, a finishing structure, a deck, an outbuilding, a barn, a shed, and a play house.

12. A method for assembling a building lumber package including a plurality of different dimension lumber needed to build a structure, comprising:
    identifying a plurality of different dimension lumber needed to build the structure for the building lumber package,
    designating one or more bins of a lumber sorter for accumulating the identified lumber for the building lumber package,
    conveying a plurality of different dimension lumber into the lumber sorter,
    receiving dimension information for each of the plurality of different dimension lumber received by the sorter, and
    controlling the lumber sorter to place each of the plurality of different dimension lumber into the one or more designated bins, where lumber having at least one different dimension selected from length and width are sorted together into the same bin as part of the same building lumber package.

13. The method for assembling a building lumber package including a plurality of different dimension lumber needed to build a structure according to claim 12, further comprising:
sequentially conveying bundles of dimension lumber into the lumber sorter, each bundle consisting of lumber having the same length, width and thickness.

14. The method for assembling a building lumber package including a plurality of different dimension lumber needed to build a structure according to claim 13, wherein;
at least one bundle of dimension lumber is a partial bundle produced at the end of a run of particular dimension boards at the lumber mill.

15. The method for assembling a building lumber package including a plurality of different dimension lumber needed to build a structure according to claim 12, further comprising:
conveying a bundle of dimension lumber into the lumber sorter, the bundle consisting of lumber having at least one different dimension selected from length and width.

16. The method for assembling a building lumber package including a plurality of different dimension lumber needed to build a structure according to claim 15, wherein;
at least one bundle of dimension lumber is a mixed bundle of missorted lumber produced at the lumber mill.

17. The method for assembling a building lumber package including a plurality of different dimension lumber needed to build a structure according to claim 12, further comprising:
detecting grade information identifying each of the plurality of different dimension lumber received by the sorter; and
controlling the lumber sorter to place different grade lumber into the one or more designated bins.

18. The method for assembling a building lumber package including a plurality of different dimension lumber needed to build a structure according to claim 12, further comprising:
receiving a house plan, and
identifying from the house plan a plurality of different dimension and grade lumber for a framing lumber package.

19. The method for assembling a building lumber package including a plurality of different dimension lumber needed to build a structure according to claim 12, further comprising:
forming lumber sorted into the one or more bins designated for the building lumber package into one or more bundles at a lumber mill; and
shipping the one or more bundles directly from the lumber mill to a building site.

20. The method for assembling a building lumber package including a plurality of different dimension lumber needed to build a structure according to claim 12, further comprising:
receiving at a lumber mill a bill of materials identifying the plurality of different dimension lumber required for the building lumber package.

21. The method for assembling a building lumber package including a plurality of different dimension lumber needed to build a structure according to claim 20, wherein the bill of materials consists of a house plan.

22. The method for assembling a building lumber package including a plurality of different dimension lumber needed to build a structure according to claim 20, wherein the bill of materials consists of an automatically generated list of materials provided by a homebuilder.

23. The method for assembling a building lumber package including a plurality of different dimension lumber needed to build a structure according to claim 12, wherein the building lumber package comprises one or more of the group of packages consisting of: a framing package, a roofing package, a forms package, a cornice package, a finish package, a deck package, an outbuilding package, a barn package, a shed package, and a playhouse package.

* * * * *